3,482,669
ONE WAY FLUID PRESSURE CLUTCH
Richard W. Foster-Pegg, Warren, Pa., assignor to Struthers Energy Systems, Inc., a corporation of Delaware
Filed Jan. 17, 1968, Ser. No. 698,607
Claims priority, application Great Britain, Jan. 20, 1967, 3,180/67
Int. Cl. F16d 25/00, 13/04, 7/02
U.S. Cl. 192—85          3 Claims

ABSTRACT OF THE DISCLOSURE

Backlash between a drive shaft and a driving element of a clutch align ports to allow oil pressure to engage the clutch as the drive shaft overruns the driven shaft and to disengage the clutch if the drive shaft slows down or the driven shaft overruns the drive shaft.

Background of the invention

This invention relates to clutches, more particularly to overrunning or free wheeling clutches. A clutch of this invention may be used to connect one of several gas turbines to a standby generator so that, as load factors increase, additional turbines may be connected to the generator.

Summary of the invention

A drive and a driven shaft have a friction clutch therebetween. When the driven shaft rotates to overrun the drive shaft, clutch drag misaligns ports in a clutch shaft entering the drive shaft so that the clutch disengages or remains disengaged. When the drive shaft is rotated and overtakes the driven shaft, the ports in the drive shaft and the clutch shaft are aligned to engage the clutch. Thus a backlash is built into the coupling between the clutch shaft and the drive shaft so that the ports therein can be shifted into and out of alignment to operate the clutch.

Description of the preferred embodiment

Figure 1:
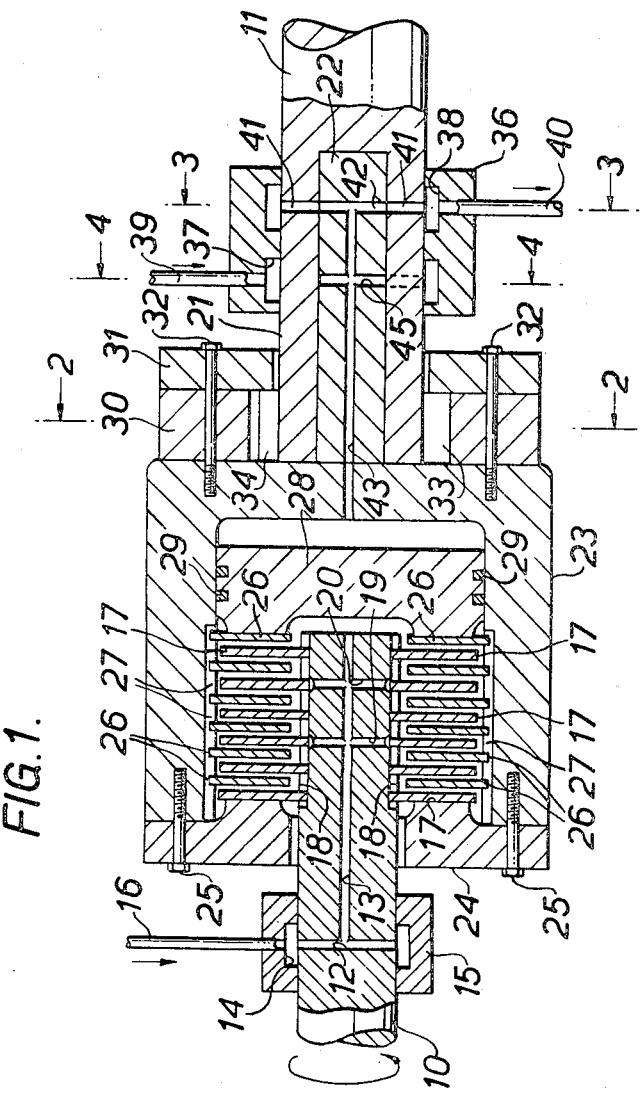
FIGURE 1 is a longitudinal, vertical section through a clutch according to this invention.

A driven shaft 10 is connected to a load which might be a power generator (not shown). A drive shaft 11 is connected to a gas turbine of the like (not shown) which is only to be connected to the generator when additional power is required. Thus, shaft 10 must be free to rotate while shaft 11 is at rest, but should shaft 11 be brought up to the speed of shaft 10, shaft 11 should be smoothly connected to shaft 10 to drive it.

Drive shaft 10 contains at least one transverse oil passage 12 connected to an axial passage 13. Passage 12 is disposed within an annular internal groove 14 in the oil delivery sleeve 15 which is disposed with slight clearance about shaft 10. Oil at low pressure is delivered through pipe 16 to sleeve 15 to flow down axial passage 13. Driven clutch plates 17 are fixed to rotate with shaft 10 by means of spines 18 or the like. Transverse oil passages 19 and 20 may be provided to deliver oil to the plates 17.

Drive shaft 11 has a hollow end 21 which is bored out to receive the clutch shaft 22. Shaft 22 supports the hollow cylindrical clutch housing 23 which is closed by cover 24 secured by bolts 25. Driving clutch plates 26 are fixed to rotate with housing 23 by means of internal splines 27 or the like. A piston 28 having piston rings or seals 29 is slidably mounted in housing 23 beyond the stack of clutch plates 17 and 26.

Figure 2:
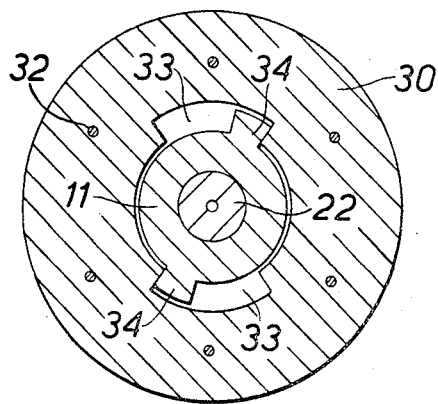
FIGURES 2, 3 and 4 are transverse sections taken on lines 2—2, 3—3, and 4—4, respectively, of FIGURE 1.

As shown in FIGURES 1 and 2, housing 23 has an end block 30 and an end plate 31 fixed thereon about the end 21 of shaft 11 by means of the bolts 32. End block 30 contains two arcuate slots 33 and shaft 11 has two lugs 34 formed thereon to extend within slots 33. Thus shaft 22 is constrained to rotate with shaft 11 with a backlash or relative rotation allowed by movement of the lugs 34 in the arcuate slots 33.

Figure 3:
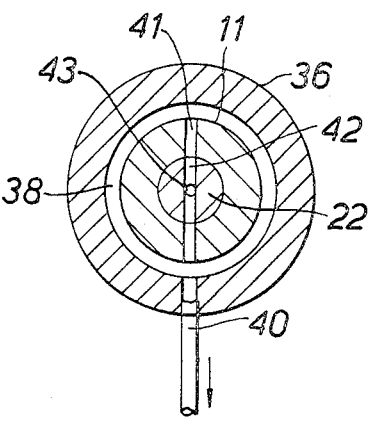
Figure 4:
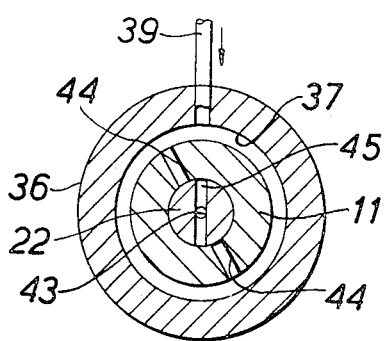

As shown in FIGURES 1, 3 and 4, an oil delivery sleeve 36 fits with slight clearance about shaft 11. Sleeve 36 contains two internal circumferential grooves 37 and 38. Pipe 39 conducts oil at high pressure to groove 37 and pipe 40 drains oil from groove 38 to relieve any oil pressure therein. Shaft 11, as shown in FIGURES 1 and 3, contains ports 41. Shaft 22 contains the transverse ports 42 communicating with the axial passage 43. As shown in FIGURE 4, shaft 11 contains ports 44 and shaft 22 contains the transverse ports 45 which also communicate with the axial passage 43. Passage 43 leads into housing 23 in front of piston 28.

This invention operates in the following manner. As shown in FIGURE 1, shaft 10 is rotating and clutch drag between plates 17 and 26 has rotated end block 30 to the limit allowed by lugs 34. Oil under pressure entering pipe 39 is blocked from entering the axial passage 43 in shaft 22 because, as shown in FIGURE 4, ports 44 and 45 are not aligned. Oil in passage 43 may drain through the aligned ports 42 and 41 from pipe 40 to relieve pressure on the side of piston 28 facing shaft 11. This allows low pressure oil from pipe 16 flowing into housing 23 through passage 13 to push and hold piston 28 to the right as shown to keep the clutch disengaged.

As shaft 11 comes up to and passes the speed of shaft 10 to override it, drag between the clutch plates 17 and 26 will rotate shaft 11 relative to shaft 22 to align ports 44 and 45 and misalign ports 42 and 41. Oil then flows from pipe 39 at high pressure through the axial passage 43 to urge piston 28 to the left as shown in FIGURE 1 to smoothly engage the oil bathed clutch plates 17 and 26. Shaft 11 now drives shaft 10; and, as long as shaft 11 continues to drive shaft 10, the clutch will remain engaged. If shaft 11 should cease to drive and its speed fall below that of shaft 10, the clutch will again disengage.

As this invention has been described above, shaft 11 must rotate faster than shaft 10 until drag between the clutch plates 17 and 26 causes end block 30 and shaft 22 to rotate relative to shaft 11. In some cases, the clutch plates 17 and 26 may be engaged when there is too high a speed differential between shafts 11 and 10. This will cause undesired shocks and strains.

Figure 5:
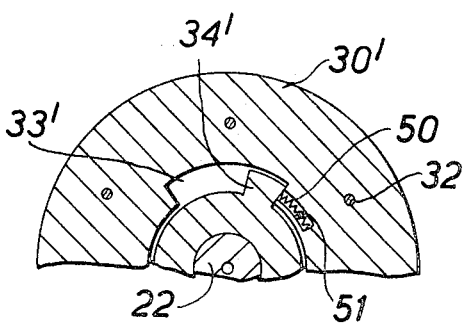
FIGURE 5 is an upper fragment of a transverse section of the clutch taken on line 2—2 of FIGURE 1 showing a modification of this invention.

As shown in FIGURE 5, the lugs 34' within the arcuate slots 33' of an end block 30' may be biased by spring loading, such as by compression springs 50 within recesses 51. If the spring loading of the backlash is such that it is very close to that of the drag of the clutch plates 17 and 26, when the drag ceases, as when drive shaft 11 is only turning slightly faster than driven shaft 10, the clutch will be engaged.

In most applications the entire clutch mechanism as shown would be placed in a sealed case so that oil could be pumped to the clutch for recirculation.

What is claimed is:
1. An overriding clutch comprising, in combination;
  (a) a driven shaft,

(b) clutch plates fixed to rotate with said driven shaft,
(c) a driving shaft having a hollow end with at least one port therein,
(d) a clutch shaft extending within the hollow end of said driving shaft,
(e) second clutch plates, said first and second clutch plates forming a multiple disk clutch, said second clutch plates exerting drag on said first clutch plates when disengaged therefrom,
(f) a housing at the end of said clutch shaft extending over said clutch plates, said second clutch plates being fixed to rotate with said housing and thereby said clutch shaft, said clutch shaft containing at least one lateral port and a longitudinal passage extending therefrom into said housing,
(g) an end block on said housing extending over said driving shaft containing at least one opening over said driving shaft,
(h) at least one lug on said driving shaft extending into said opening in said end block, said at least one lug being circumferentially movable within said opening constraining said clutch shaft to rotate with said driving shaft with backlash,
(i) a fluid delivery sleeve fixed about said hollow end of said driving shaft over said at least one port in said driving shaft, said ports being aligned when said driving shaft is rotated to take up backlash between said clutch shaft and said driving shaft,
(j) means delivering fluid under pressure to said sleeve, and
(k) means responsive to the flow of fluid from the passage in said clutch shaft engaging said first and second clutch elements.

2. The combination according to claim 1 wherein said clutch shaft and said driving shaft contain a second set of ports communicating with the longitudinal passage in said clutch shaft, said second set of ports being aligned releasing pressure in said longitudinal passage and said housing when said driven shaft rotates faster than said driving shaft and clutch drag rotates said clutch shaft within said driving shaft.

3. The combination according to claim 2 with the addition of means introducing a fluid under low pressure into said casing on the side of said piston facing said clutch plates to disengage said clutch plates.

References Cited

UNITED STATES PATENTS 2,729,980   1/1956   Lammerz et al. _____ 192—41 X
3,107,765   10/1963   Davies.

FOREIGN PATENTS 726,652   10/1942   Germany.

BENJAMIN W. WYCHE III, Primary Examiner

U.S. Cl. X.R.

192—41, 56